(12) United States Patent
Lowell

(10) Patent No.: US 10,359,257 B2
(45) Date of Patent: Jul. 23, 2019

(54) INTERNAL SCOPE CAP

(71) Applicant: Seth Lowell, Macungie, PA (US)

(72) Inventor: Seth Lowell, Macungie, PA (US)

(\*) Notice: Subject to any disclaimer, the term of this patent is extended or adjusted under 35 U.S.C. 154(b) by 0 days.

(21) Appl. No.: 15/963,864

(22) Filed: Apr. 26, 2018

(65) Prior Publication Data

US 2018/0313635 A1   Nov. 1, 2018

Related U.S. Application Data

(63) Continuation-in-part of application No. 29/609,136, filed on Jun. 28, 2017.

(60) Provisional application No. 62/490,346, filed on Apr. 26, 2017.

(51) Int. Cl.
| | |
|---|---|
| *F41G 11/00* | (2006.01) |
| *F41G 1/38* | (2006.01) |
| *G02B 23/16* | (2006.01) |
| *G02B 1/11* | (2015.01) |
| *G02B 5/02* | (2006.01) |

(52) U.S. Cl.
CPC .............. *F41G 11/00* (2013.01); *F41G 1/383* (2013.01); *G02B 23/16* (2013.01); *G02B 1/11* (2013.01); *G02B 5/0294* (2013.01); *G02B 2207/123* (2013.01)

(58) Field of Classification Search
CPC .......... F41G 1/383; F41G 11/00; G02B 23/16
See application file for complete search history.

(56) References Cited

U.S. PATENT DOCUMENTS

| | | | | |
|---|---|---|---|---|
| 3,143,045 A | * | 8/1964 | Kaminski | G03B 7/085 352/141 |
| 4,378,146 A | * | 3/1983 | Suzuki | G03B 9/06 359/230 |
| 4,588,276 A | * | 5/1986 | Kaise | G03B 9/06 396/508 |
| 6,872,013 B2 | * | 3/2005 | Guy | G03B 9/02 396/508 |
| 7,559,709 B2 | * | 7/2009 | Oh | G03B 9/06 396/510 |
| 7,898,749 B2 | * | 3/2011 | Ford | G02B 17/002 359/726 |
| 2011/0235001 A1 | * | 9/2011 | Matsumoto | G02B 5/005 353/97 |

\* cited by examiner

*Primary Examiner* — Bret Hayes

(57) ABSTRACT

An internal scope cap affixes onto a scope for a firearm to protect and enclose a scope lens of the scope. The internal scope cap includes an iris diaphragm and a scope mount. The iris diaphragm allows the user to adjust an iris opening to expose or enclose the scope lens. The iris opening is formed from a plurality of iris blades that are manipulated through a blade actuator. As the blade actuator is rotated, the diameter of the iris opening is adjusted proportionately to the angular rotation. The iris diaphragm is removably connected to the scope mount to allow the user to interchange and remove the iris diaphragm from the scope mount. The scope mount affixes the internal scope cap onto the scope of the firearm. A glare-reduction lattice and a protective lens are implemented to reduce glint and glare to the user, while gazing through the scope.

6 Claims, 10 Drawing Sheets

INTERNAL SCOPE CAP

The current application claims a priority to the U.S. Provisional Patent application Ser. No. 62/490,346 filed on Apr. 26, 2017.

FIELD OF THE INVENTION

The present invention relates generally to a scope accessory. More specifically, the present invention is scope cap utilizing an iris diaphragm to protect a lens of the scope, as well as, a glare-reduction lattice and a secondary protective lens to reduce glint and glare to the user.

BACKGROUND OF THE INVENTION

Traditional scope caps, when opened, increase exposed surface area and can place the user in a tactical disadvantage due to the size of the cap in the open position. Additionally, light can reflect off scope lenses when the cap is opened, further increasing tactical risk to the user. Traditional scope caps do not provide the user with an option to partially cover the scope lens consistently, to reduce glare. The traditional scope cap either fully encloses the scope lens in a closed configuration or fully reveals the scope lens in an open configuration.

The present invention is an internal scope cap, an alternative to traditional scope caps. The present invention does not implement a cap that is able to swing open or require removal to operate the scope effectively. The present invention includes an iris diaphragm, that allows the user to pivot a blade actuator, opening or closing the iris diaphragm to expose the scope lens to the user or cover the scope lens to prevent the scope lens from dust, debris, or other sources of occlusion. An iris opening is able to be locked into position allowing the user to look through a protective lens and through the scope lens. The present invention's design allows for a more aesthetically appealing design and can implement different colored lenses to reduce reflection from scope lenses. The present invention is designed to match the look and feel of a high-end rifle with an advanced optic system while providing greater protection for the scope lens. The present invention can be customized for different applications, including military, law enforcement, and civilian applications. The present invention is better tactically and provides greater protection than traditional scope caps for scope lenses.

DETAIL DESCRIPTIONS OF THE INVENTION

All illustrations of the drawings are for the purpose of describing selected versions of the present invention and are not intended to limit the scope of the present invention.

The present invention is an internal scope cap. The present invention affixes onto a scope for a firearm in order to protect a lens of the scope from dust, debris, or other sources of occlusion while the firearm is transported or in storage. The present invention allows the user to utilize the scope without disengaging a cap from the scope. Additionally, the present invention decreases tactical risk to the user by eliminating the exposure of a traditional scope cap in the open position, as well as reducing light reflection from the scope lens that may put the user at a tactical disadvantage.

Figure 1:
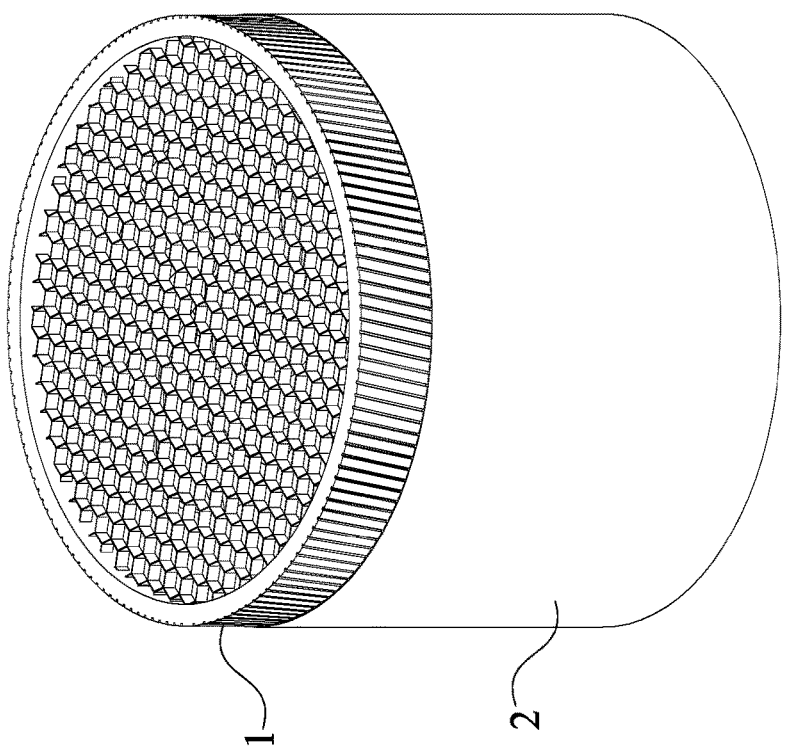
FIG. 1 is a perspective view of the present invention.
Figure 4:
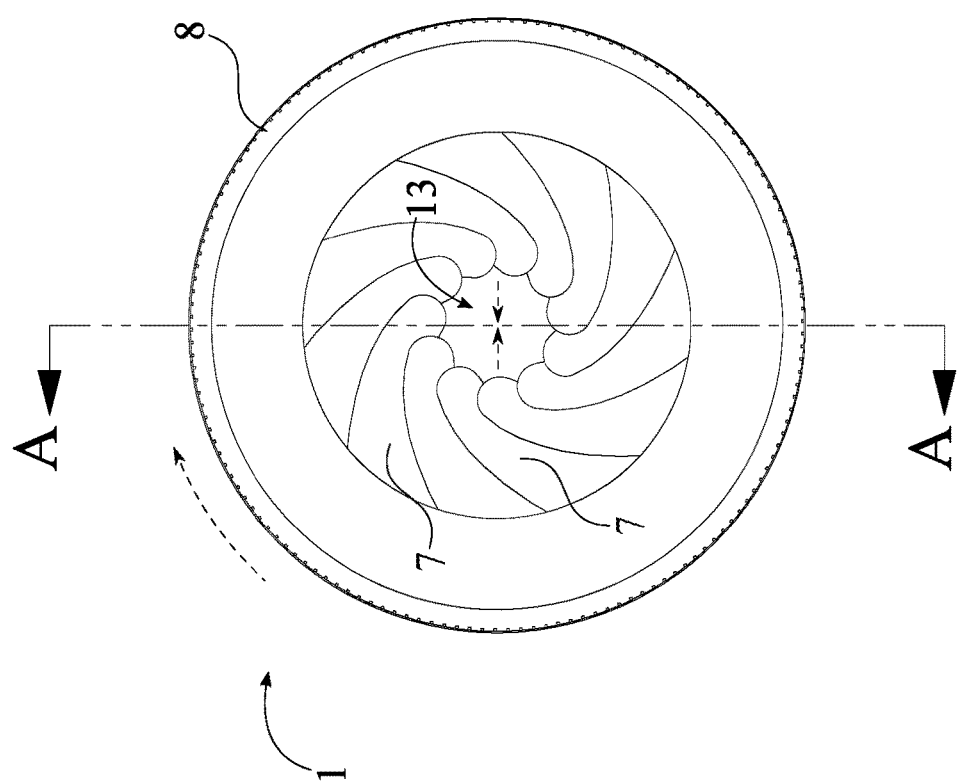
FIG. 4 is a top view of the present invention, wherein a glare-reduction lattice is removed.
Figure 7:
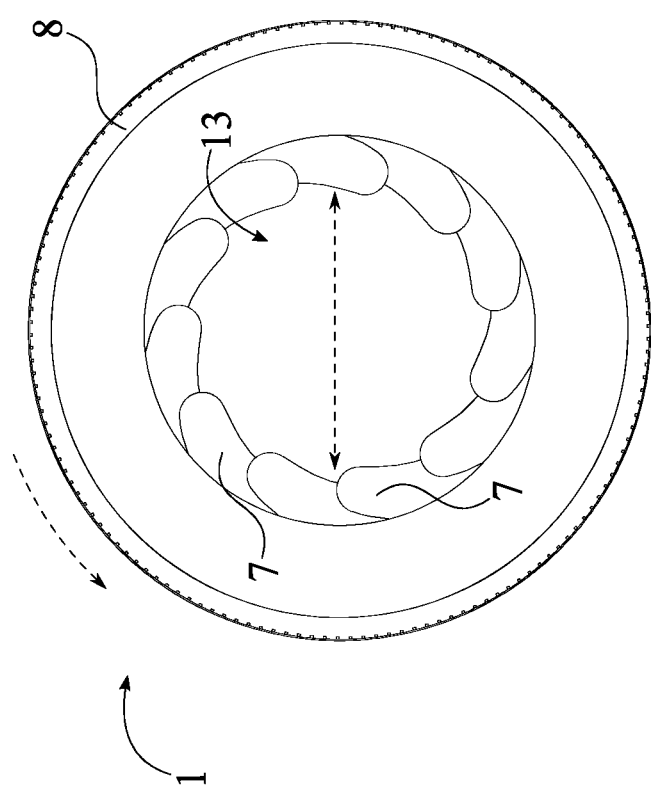
FIG. 7 is a top view of the present invention, wherein a glare-reduction lattice is removed, and wherein an iris opening is in an expanded configuration.
Figure 8:
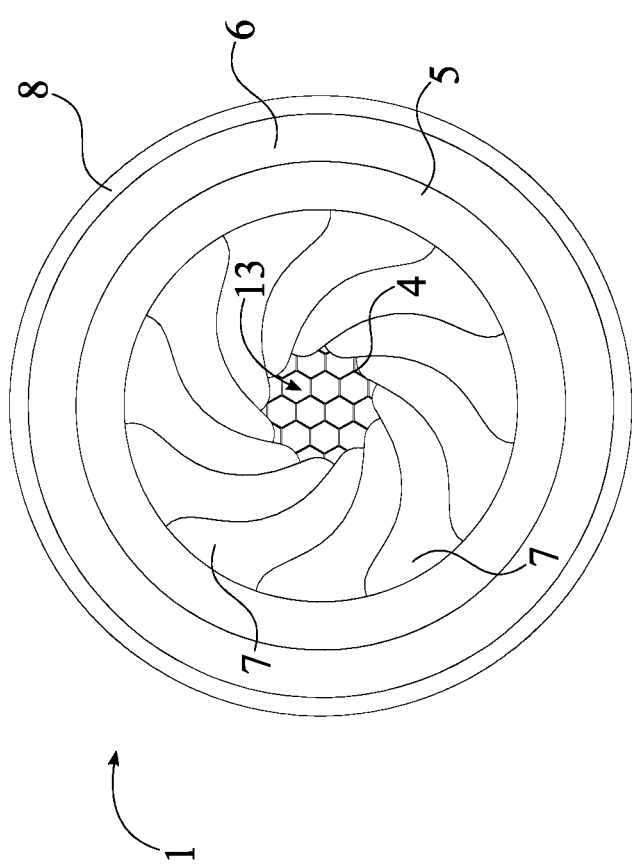
FIG. 8 is a bottom view of the iris diaphragm.
Figure 9:
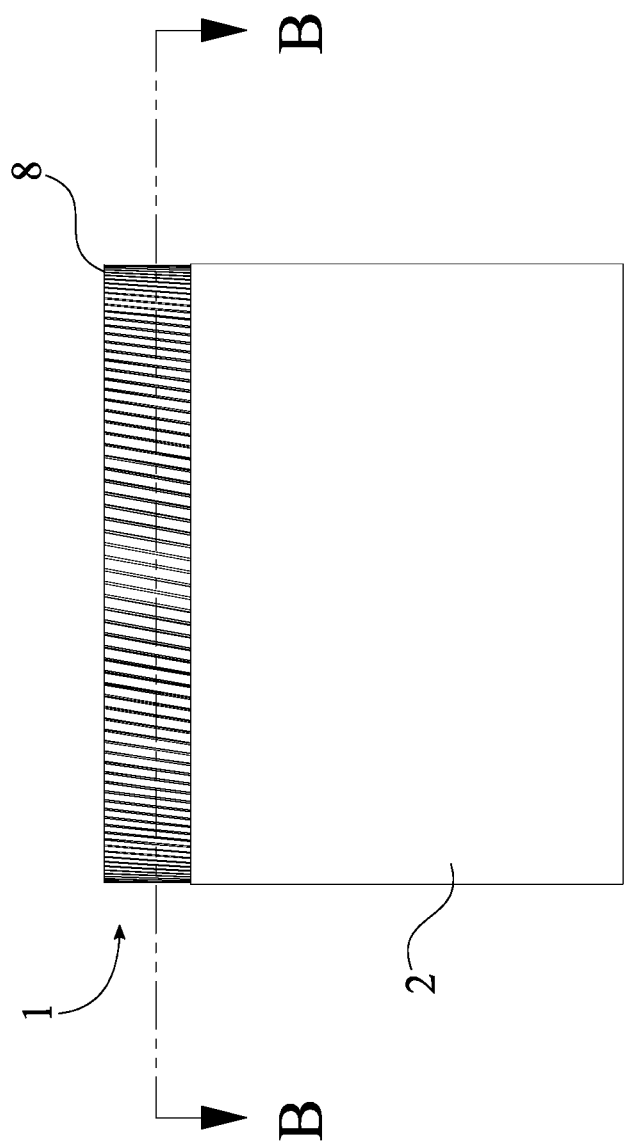
FIG. 9 is a lateral view of the present invention.
Figure 10:
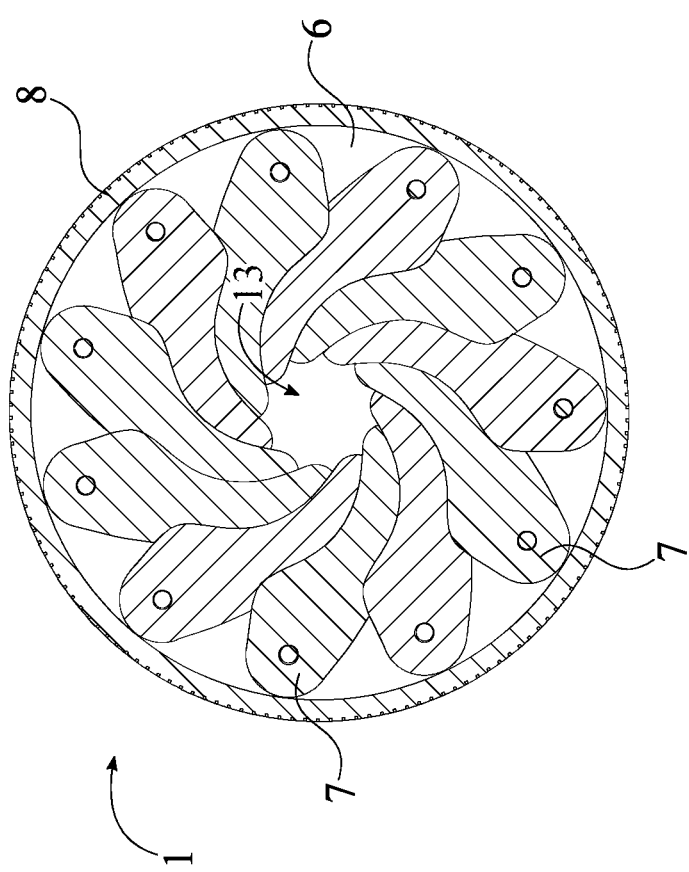
FIG. 10 is a cross-sectional view of the iris diaphragm along the line B-B, shown in FIG. 9.

In accordance to FIG. 1 and FIG. 9, the present invention comprises an iris diaphragm 1 and a scope mount 2. The iris diaphragm 1 protects and encloses the scope lens. The iris diaphragm 1 comprises an attachment tube 5, an annular base 6, a plurality of iris blades 7, and a blade actuator 8. The attachment tube 5 secures the iris diaphragm 1 onto the scope mount 2. The annular base 6 supports the plurality of iris blades 7. The attachment tube 5 is perimetrically connected to the annular base 6, shown in FIG. 8. The plurality of iris blades 7 forms an iris opening 13 to protect the scope lens, as well as, to expose the scope lens during implementation of the scope lens. Each of the plurality of iris blades 7 is pivotably connected to the annular base 6, shown in FIG. 10. The plurality of iris blades 7 is oppositely positioned to the attachment tube 5 about the annular base 6, shown in FIG. 5 and FIG. 6. The plurality of iris blades 7 is evenly distributed about the annular base 6, such that the plurality of iris blades 7 completely converges towards a center of the iris opening 13 as the iris opening 13 is closed to encapsulate the scope lens, detailed in FIG. 10. The blade actuator 8 allows the user to control the diameter of the iris opening 13. The blade actuator 8 is rotatably connected to the annular base 6. In accordance to the preferred embodiment of the present invention, an external lateral surface 14 of the blade actuator 8 is knurled. A knurled external lateral surface 14 provides additional traction to the user's grasp when rotating the blade actuator 8, shown in FIG. 2. The iris opening 13 is diametrically adjustable through the rotation of the blade actuator 8, about the annular base 6. Therefore, as the user rotates the blade actuator 8 about the annular base 6, the diameter of the iris opening 13 adjusts proportional to the angular rotation of the blade actuator 8, in accordance to FIG. 4 and FIG. 7.

Figure 2:
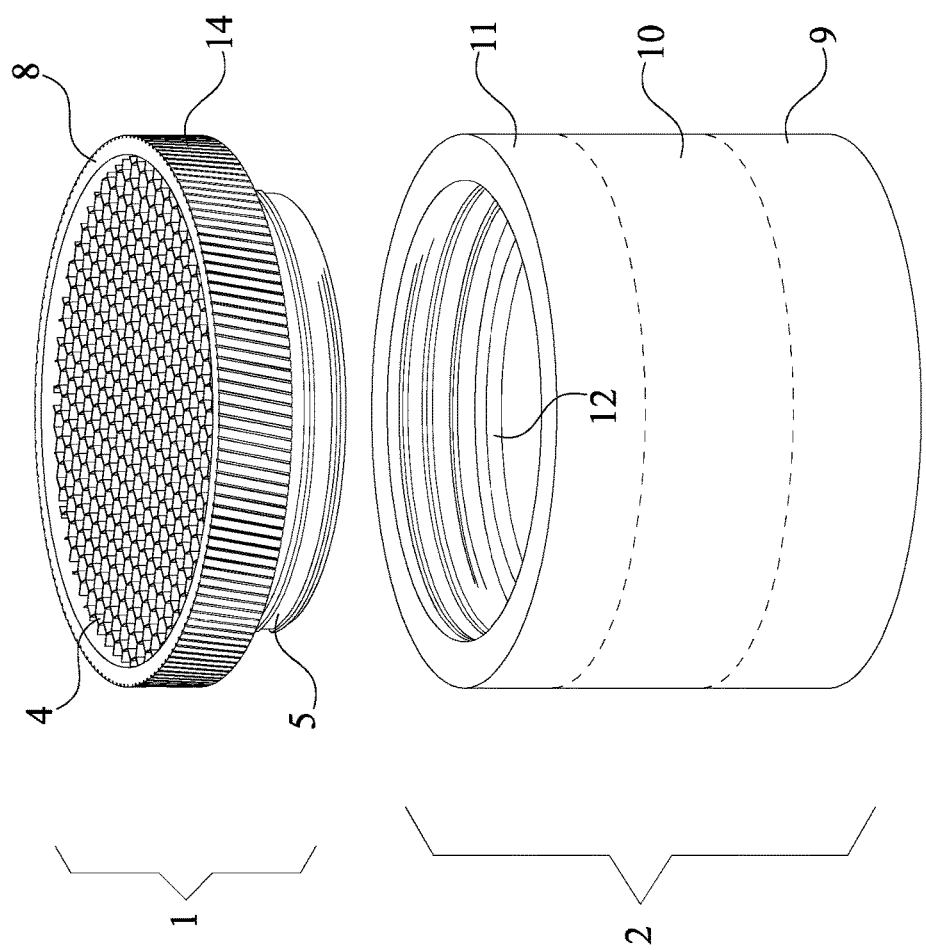
FIG. 2 is an exploded view of the present invention, wherein the iris diaphragm is removed from the scope mount.
Figure 5:
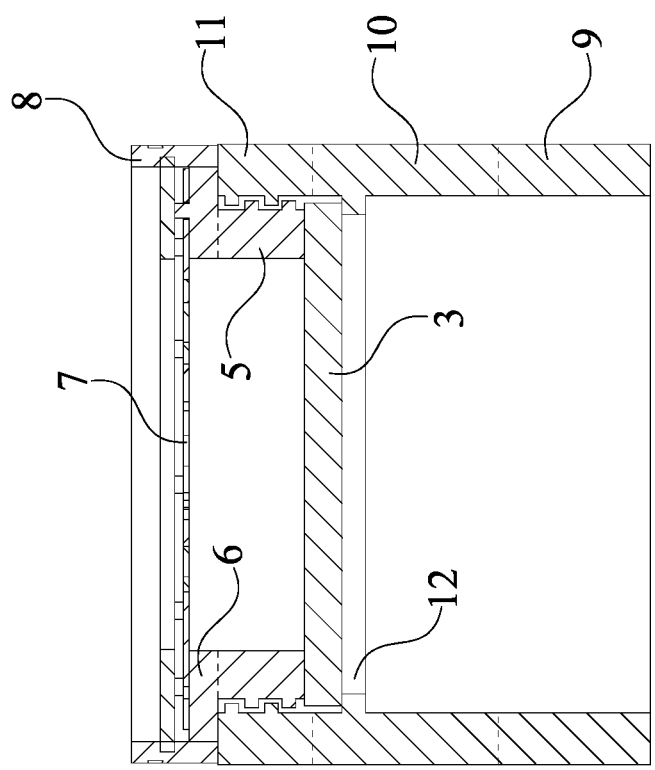
FIG. 5 is a cross-sectional view of the present invention along the line A-A, shown in FIG. 4, wherein a protective lens is positioned between a scope restraint and an attachment tube.
Figure 6:
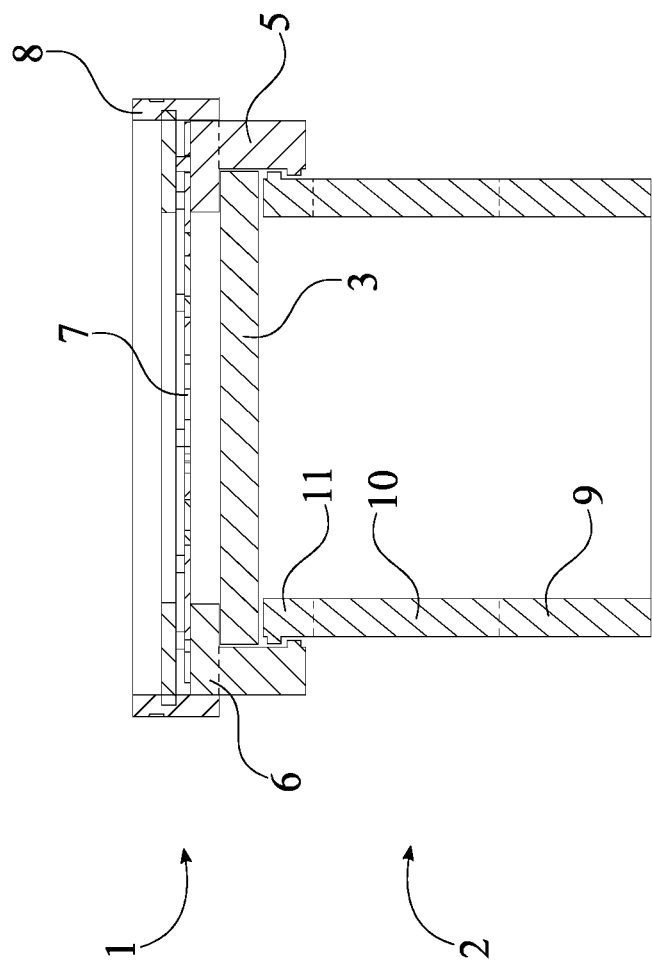
FIG. 6 is a cross-sectional view of the present invention along the line A-A, shown in FIG. 4, wherein a protective lens is positioned between a scope-interfacing end and an annular base.

The scope mount 2 comprises a scope-interfacing end 9, a lateral wall 10, and a diaphragm-interfacing end 11, shown in FIG. 2, FIG. 5, and FIG. 6. The scope of the firearm is positioned within the scope-interfacing end 9 to secure the present invention onto the scope during implementation. The scope-interfacing end 9 is perimetrically connected to the lateral wall 10. The diaphragm-interfacing end 11 supports the iris diaphragm 1. The diaphragm-interfacing end 11 is perimetrically connected to the lateral wall 10. The scope-interfacing end 9 is oppositely positioned to the diaphragm-interfacing end 11 along the lateral wall 10. The attachment tube 5 selectively engages the diaphragm-interfacing end 11. This configuration allows the iris diaphragm 1 to be modular such that the iris diaphragm 1 is able to be interchanged for repair or replacement with another. In accordance to the preferred embodiment of the present invention, the attachment tube 5 threadedly engages the diaphragm-interfacing end 11, in order to allow the user to quickly interchange or remove the iris diaphragm 1 from the scope mount 2.

In some embodiments of the present invention, the present invention comprises a protective lens 3, detailed in FIG. 5 and FIG. 6. The protective lens 3 provides additional protection to the scope lens. In addition, the protective lens 3 is able to reduce glint and glare by refracting incidental light. The protective lens 3 is selected to be either transparent or translucent. Wherein the protective lens 3 is translucent, the protective lens 3 absorbs wavelengths of light corresponding to the coloration of the protective lens 3, reducing the strain on the user's eye while gazing through the scope. In accordance to the preferred embodiment, the protective lens 3 is pressed between the diaphragm-interfacing end 11 and the annular base 6, in order to secure the protective lens 3 between the scope mount 2 and the iris diaphragm 1, wherein the diaphragm-interfacing end 11 is positioned within the attachment tube 5, shown in FIG. 6. The user disengages the iris diaphragm 1 from the scope mount 2 to access the protective lens 3 for cleaning or replacing the protective lens 3.

In some other embodiments of the present invention, the scope mount 2 further comprises a scope restraint 12, shown in FIG. 2 and FIG. 5. The scope restraint 12 limits how far the scope is able to be positioned within the scope mount 2. The scope restraint 12 is internally connected around the lateral wall 10 in order to inhibit the distance that the scope is able to be positioned into the scope mount 2. The scope restraint 12 is offset from the scope-interfacing end 9 in order to set a maximum depth that the scope is able to be positioned within the scope mount 2. In a more specific embodiment of the present invention, the protective lens 3 is pressed between the scope restraint 12 and the attachment tube 5, wherein the attachment tube 5 is positioned within the diaphragm-interfacing end 11, in order to secure the protective lens 3 between the scope restraint 12 and the attachment tube 5.

Figure 3:
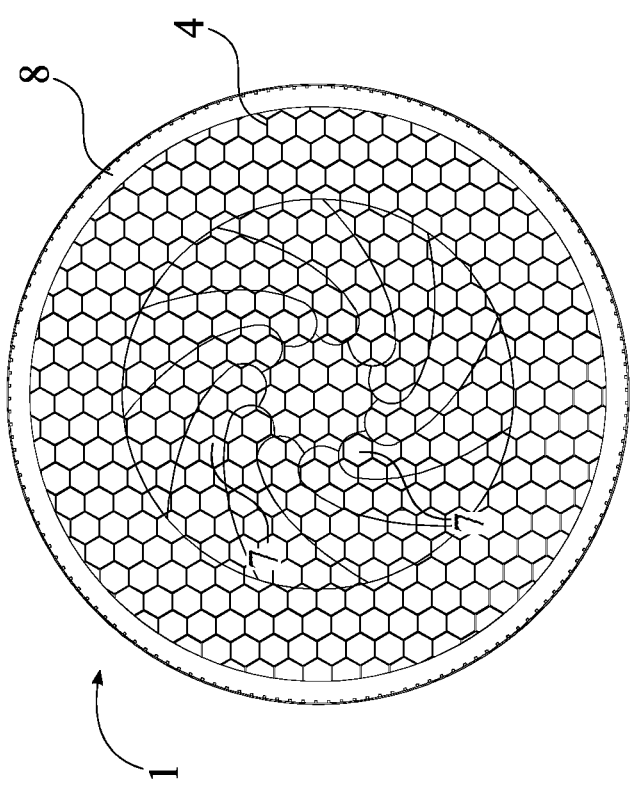
FIG. 3 is a top view of the present invention.

In accordance to the preferred embodiment of the present invention, the present invention comprises a glare-reduction lattice 4, detailed in FIG. 2 and FIG. 3. The glare-reduction lattice 4 reduces glint and glare from light reflecting from the scope lens towards the user's eyes. The glare-reduction lattice 4 is adjacently connected to the blade actuator 8. The glare-reduction lattice 4 is oriented parallel to the plurality of iris blades 7 in order to allow the user to view through the glare reduction lattice into the scope. The glare-reduction lattice 4 is offset from the plurality of iris blades 7, such that the glare-reduction lattice 4 does not interfere with enlarging or reducing of the iris opening 13. The glare-reduction lattice 4 is preferred to be a hexagonal lattice. The hexagonal lattice provides structural support to the blade actuator 8 from lateral pressure while limiting the visual occlusion through the glare-reduction lattice 4.

Although the invention has been explained in relation to its preferred embodiment, it is to be understood that many other possible modifications and variations can be made without departing from the spirit and scope of the invention as hereinafter claimed.

What is claimed is:

1. An internal scope cap comprising:
    an iris diaphragm;
    a scope mount;
    a translucent protective lens;
    a glare-reduction lattice;
    the scope mount being removably engaged with the iris diaphragm;
    the translucent protective lens being pressed in between the iris diaphragm and the scope mount;
    the glare-reduction lattice being connected to the iris diaphragm;
    the iris diaphragm comprising an attachment tube, an annular base, a plurality of iris blades and a blade actuator;
    the scope mount comprising a scope-interfacing end, a lateral wall and a diaphragm-interfacing end;
    the attachment tube being perimetrically connected to the annular base;
    each of the plurality of iris blades being pivotably connected to the annular base;
    the plurality of iris blades being oppositely positioned to the attachment tube about the annular base;
    the plurality of iris blades being axially located in between the translucent protective lens and the glare-reduction lattice;
    the blade actuator being rotatably connected to the annular base;
    the blade actuator being radially and externally connected around the annular base;
    the plurality of iris blades forming an iris opening;
    the iris opening being diametrically adjustable through the rotation of the blade actuator;
    the scope-interfacing end being perimetrically connected to the lateral wall;
    the diaphragm-interfacing end being perimetrically connected to the lateral wall;
    the scope-interfacing end being oppositely positioned to the diaphragm-interfacing end along the lateral wall;
    the diaphragm-interfacing end being threadedly engaged with the attachment tube;
    the translucent protective lens being offset from the plurality of iris blades;
    the glare-reduction lattice being radially and internally connected around the blade actuator;
    the glare-reduction lattice being parallelly oriented to the plurality of iris blades; and
    the glare-reduction lattice being offset from the plurality of iris blades.

2. The internal scope cap, as claimed in claim 1, comprising:
    the plurality of iris blades being evenly distributed about the annular base.

3. The internal scope cap, as claimed in claim 1, comprising:
    the translucent protective lens being pressed in between the diaphragm-interfacing end and the annular base.

4. The internal scope cap, as claimed in claim 1, comprising:
    the glare-reduction lattice being a hexagonal lattice.

5. The internal scope cap, as claimed in claim 1, comprising:
    an external lateral surface of the blade actuator being knurled.

6. The internal scope cap, as claimed in claim 1, comprising:
    the scope mount comprising a scope restraint;
    the scope restraint being internally connected around the lateral wall;

the scope restraint being offset from the scope-interfacing end; and the translucent protective lens being pressed in between the scope restraint and the annular base.

* * * * *